US011873820B2

(12) United States Patent
Post et al.

(10) Patent No.: US 11,873,820 B2
(45) **Date of Patent: *Jan. 16, 2024**

(54) WATER HEATER BLOWER HOUSING, IMPELLER, AND STATIC TAP SYSTEM

(71) Applicant: Regal Beloit America, Inc., Beloit, WI (US)

(72) Inventors: Steven W. Post, Centerton, AR (US); Lyn D. Coones, Cassville, MO (US); Jeffrey J. Long, Purdy, MO (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,406

(22) Filed: Nov. 17, 2022

(65) Prior Publication Data

US 2023/0081987 A1 Mar. 16, 2023

Related U.S. Application Data

(63) Continuation of application No. 16/799,164, filed on Feb. 24, 2020, now Pat. No. 11,519,417.

(51) Int. Cl.

| | |
|---|---|
| ***F04D 29/00*** | (2006.01) |
| ***F04D 17/16*** | (2006.01) |
| ***F04D 29/40*** | (2006.01) |
| ***F04D 29/42*** | (2006.01) |
| ***F04D 29/28*** | (2006.01) |
| ***F04D 13/06*** | (2006.01) |

(52) U.S. Cl.
CPC ............. *F04D 13/06* (2013.01); *F04D 17/16* (2013.01); *F04D 29/002* (2013.01); *F04D 29/281* (2013.01); *F04D 29/403* (2013.01); *F04D 29/4206* (2013.01); *F04D 29/4226* (2013.01); *F05D 2250/70* (2013.01)

(58) Field of Classification Search
CPC ...... F04D 17/16; F04D 29/002; F04D 29/281; F04D 29/403; F04D 29/4206; F04D 29/4226; F05D 2250/70
See application file for complete search history.

(56) References Cited

U.S. PATENT DOCUMENTS 5,839,374 A * 11/1998 Conner ................. F04D 27/008 110/162
6,318,358 B1 11/2001 Gatley, Jr.

(Continued)

*Primary Examiner* — Christopher S Bobish
(74) *Attorney, Agent, or Firm* — Thompson Coburn LLP

(57) ABSTRACT

A blower has a blower housing of clamshell construction, including two housing members having a scroll back wall molded with radial draft, an impeller and a motor within the housing, and a static tap connected to the housing. The impeller has a backplate with a backplate back surface region of substantially the same radially converging shape as that of a front surface region of the scroll back wall formed by the radial draft, providing a substantially uniform axial gap between the backplate back surface region and the scroll back wall. The impeller has a ring connected by a skirt to the back plate to define a stepped area behind the ring. The impeller includes impeller blades extending forwardly from the impeller backplate and the ring and back fins extending rearwardly from the ring. The blower has a scroll width of about twice an impeller exhaust width.

29 Claims, 17 Drawing Sheets

(56) References Cited

U.S. PATENT DOCUMENTS

| | | | | |
|---|---|---|---|---|
| 6,468,034 | B1 * | 10/2002 | Garrison | F04D 29/4226 415/206 |
| 6,951,241 | B1 * | 10/2005 | Gatley | F23L 17/005 126/516 |
| 7,278,823 | B2 * | 10/2007 | Platz | F04D 29/4233 415/206 |
| 8,882,467 | B2 * | 11/2014 | Kwok | F04D 29/281 416/214 R |
| 9,004,868 | B2 * | 4/2015 | Rhodes | F04D 29/281 29/889.4 |
| 9,541,098 | B2 * | 1/2017 | Duquette | F04D 17/10 |
| 9,651,057 | B2 | 5/2017 | Lyons | |
| 9,683,582 | B2 * | 6/2017 | Avonto | F04D 29/30 |
| 9,933,185 | B2 * | 4/2018 | Kameyama | F04D 29/281 |
| 10,118,502 | B2 * | 11/2018 | Yokote | H01M 10/663 |
| 10,316,860 | B2 * | 6/2019 | Fujimoto | F04D 29/162 |
| 10,626,882 | B2 * | 4/2020 | Nakatani | F04D 17/16 |
| 2019/0374732 | A1 * | 12/2019 | Cariola | A61M 16/0066 |
| 2020/0049165 | A1 * | 2/2020 | Duquette | F04D 29/667 |
| 2020/0333028 | A1 * | 10/2020 | Patel | F04D 29/059 |
| 2021/0388849 | A1 * | 12/2021 | Wang | F04D 29/582 |

* cited by examiner

WATER HEATER BLOWER HOUSING, IMPELLER, AND STATIC TAP SYSTEM

CROSS-REFERENCE TO RELATED APPLICATIONS

This application is a continuation application of U.S. patent application Ser. No. 16/799,164, filed Feb. 24, 2020, and titled "Water Heater Blower Housing, Impeller, and Static Tap System," the entirety of which is incorporated by reference herein.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to a water heater blower having an impeller within a housing and a static tap system.

SUMMARY

One aspect of the present disclosure is a blower comprising a blower housing and an impeller within the blower housing. The impeller is rotatable about an impeller axis, the impeller axis defining perpendicular axial and radial directions. The impeller has a backplate and impeller blades extending axially forward from the backplate, the backplate including a backplate back surface region that faces axially rearward. The impeller blades have radially outer ends that combine to define an impeller outer circumference, the impeller outer circumference having an impeller outer diameter. The blower includes an exhaust pressure static tap. The backplate back surface region has a first axial end and a second axial end, the second axial end being axially rearward of the first axial end, the first axial end of the backplate back surface region having a first circumference and a first diameter, and the second axial end of the backplate back surface region having a second circumference and a second diameter. The first diameter is greater than the second diameter. The second circumference generally circumscribes the impeller axis, the first circumference generally circumscribes the second circumference, and the first circumference generally circumscribes the impeller axis. The backplate back surface region generally circumscribes the impeller axis, the backplate back surface region converging radially inwardly as the backplate back surface region extends axially rearwardly from the first axial end toward the second axial end. The backplate back surface region has a width defined as a distance from the first circumference to the second circumference in a half plane extending from the impeller axis. The blower housing has a scroll back wall axially rearward of the impeller and a scroll front wall axially forward of the impeller. The scroll back wall has a scroll back wall front surface region facing the backplate back surface region. The scroll back wall front surface region has substantially the same shape as the backplate back surface region. The backplate back surface region is spaced axially forward from the scroll back wall front surface region to form a generally uniform axial gap extending from the backplate back surface region to the scroll back wall front surface region. The scroll back wall has an exhaust pressure static tap opening adjacent the axial gap. The exhaust pressure static tap is connected to the exhaust pressure static tap opening.

Another aspect of the present disclosure is a blower comprising a blower housing and an impeller within the blower housing. The impeller is rotatable about an impeller axis, the impeller axis defining perpendicular axial and radial directions. The impeller having a backplate and impeller blades. The impeller blades are spaced from one another circumferentially about the impeller axis and extend axially forward from the backplate to a blade forward end of the respective impeller blade. The backplate includes an axially rearward facing backplate back surface region. The impeller blades have radially outer ends that combine to define an impeller outer circumference, the impeller outer circumference having an impeller outer diameter. The backplate back surface region has a first axial end and a second axial end, the second axial end being axially rearward of the first axial end. The backplate back surface region generally circumscribes the impeller axis, and the backplate back surface region converges radially inwardly as the backplate back surface region extends axially rearwardly from the first axial end toward the second axial end. The first axial end of the backplate back surface region has a first diameter and the second axial end of the backplate back surface region has a second diameter. The second diameter being not more than 75% of the first diameter and the first diameter being not less than 50% of the impeller outer diameter. A back ring is connected to the front side of the backplate and to the impeller blades, the back ring having a back ring outer diameter and a back ring inner diameter. The back ring outer diameter is greater than the backplate outer diameter. A front ring is connected to the forward ends of the impeller blades, the front ring having a front ring outer diameter and a front ring inner diameter, the front ring outer diameter being greater than the back ring outer diameter. The blower housing has a scroll back wall axially rearward of the impeller and a scroll front wall axially forward of the impeller. The backplate back surface region is spaced axially forward from the scroll back wall by a generally uniform axial gap distance to form a generally uniform axial gap extending axially rearward from the backplate back surface region to the scroll back wall.

Another aspect of the present disclosure is a blower comprising a blower housing and an impeller within the blower housing. The impeller is rotatable about an impeller axis, the impeller axis defining perpendicular axial and radial directions. The impeller comprises a backplate, impeller blades, and a ring. The backplate of the impeller has a backplate front surface and a backplate back surface, the backplate front surface facing axially forward, the backplate back surface facing axially rearward. The ring has a ring front surface and an outer circumference, the ring front surface facing axially forward, the ring being spaced axially forward of the backplate. The impeller blades are spaced from one another circumferentially about the impeller axis and have radially outer ends that combine to define an impeller outer circumference, the impeller outer circumference having an impeller outer diameter. Each of the impeller blades extends axially forward from the ring to an impeller blade forward end of the respective impeller blade. The impeller has an impeller exhaust width, the impeller exhaust width being defined as an axial distance between the ring outer circumference and the impeller blade forward ends.

The blower housing comprises a scroll back wall spaced axially rearward of the impeller and a scroll front wall axially forward of the impeller. The scroll back wall faces the backplate back surface, and the scroll front wall faces the impeller blade forward ends. The blower has a scroll width, the scroll width being a greatest axial distance from the scroll front wall to the scroll back wall at the impeller outer circumference. A ratio of the scroll width to the impeller exhaust width is not less than 1.5 and not greater than 4.0.

Further features and advantages, as well as the operation, are described in detail below with reference to the accompanying drawings.

Figure 1:
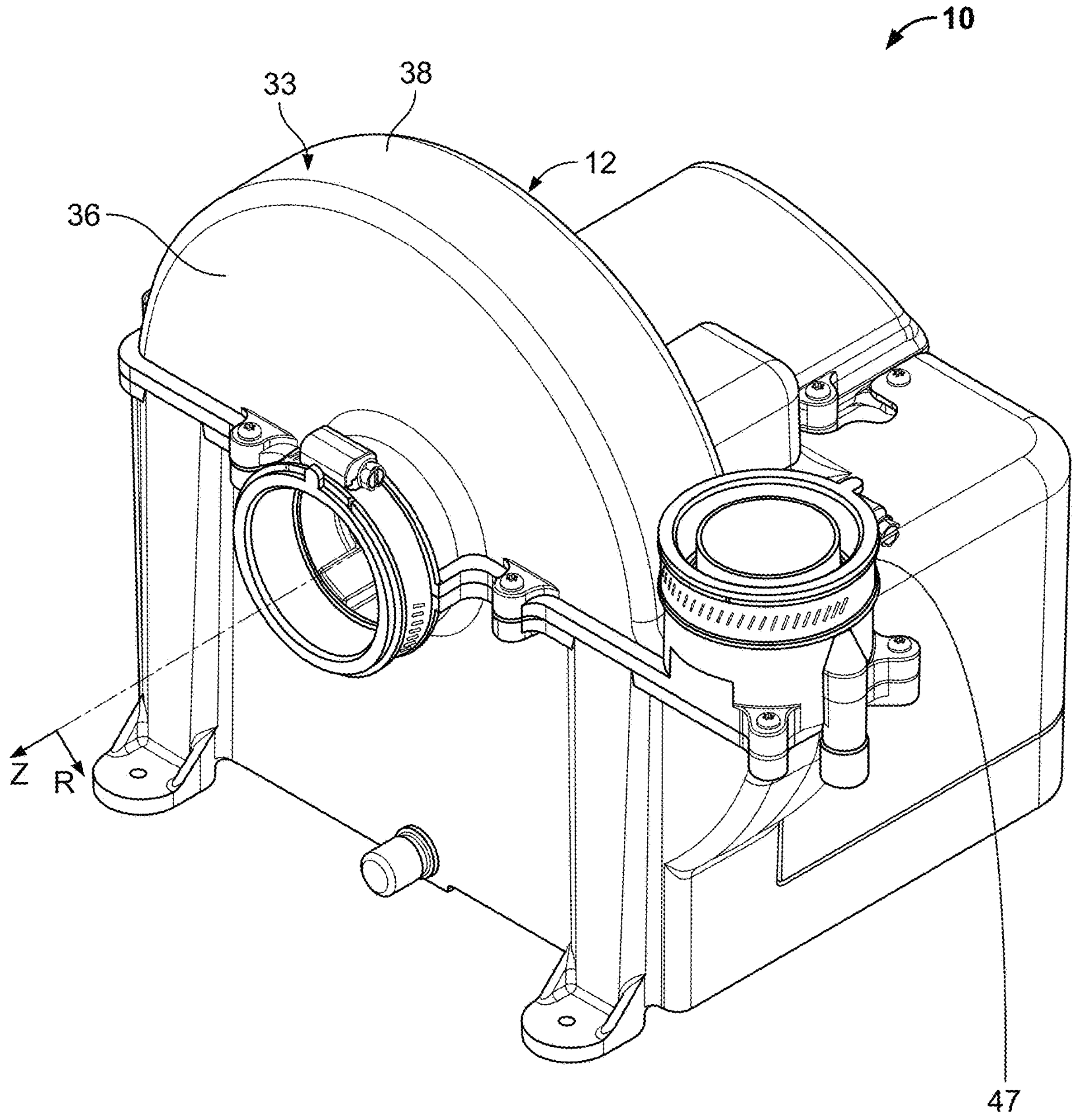
FIG. 1 is a front perspective view of a blower in accordance with an embodiment.

Reference numerals in the written specification and in the figures indicate corresponding items.

DETAILED DESCRIPTION

An embodiment of a water heater blower 10 is illustrated in FIGS. 1-16. The blower 10 comprises a molded clamshell blower housing 12, an impeller 14, and a motor 15 within the clamshell blower housing 12, and an exhaust pressure static tap 16 connected to the clamshell blower housing 12.

Figure 6:
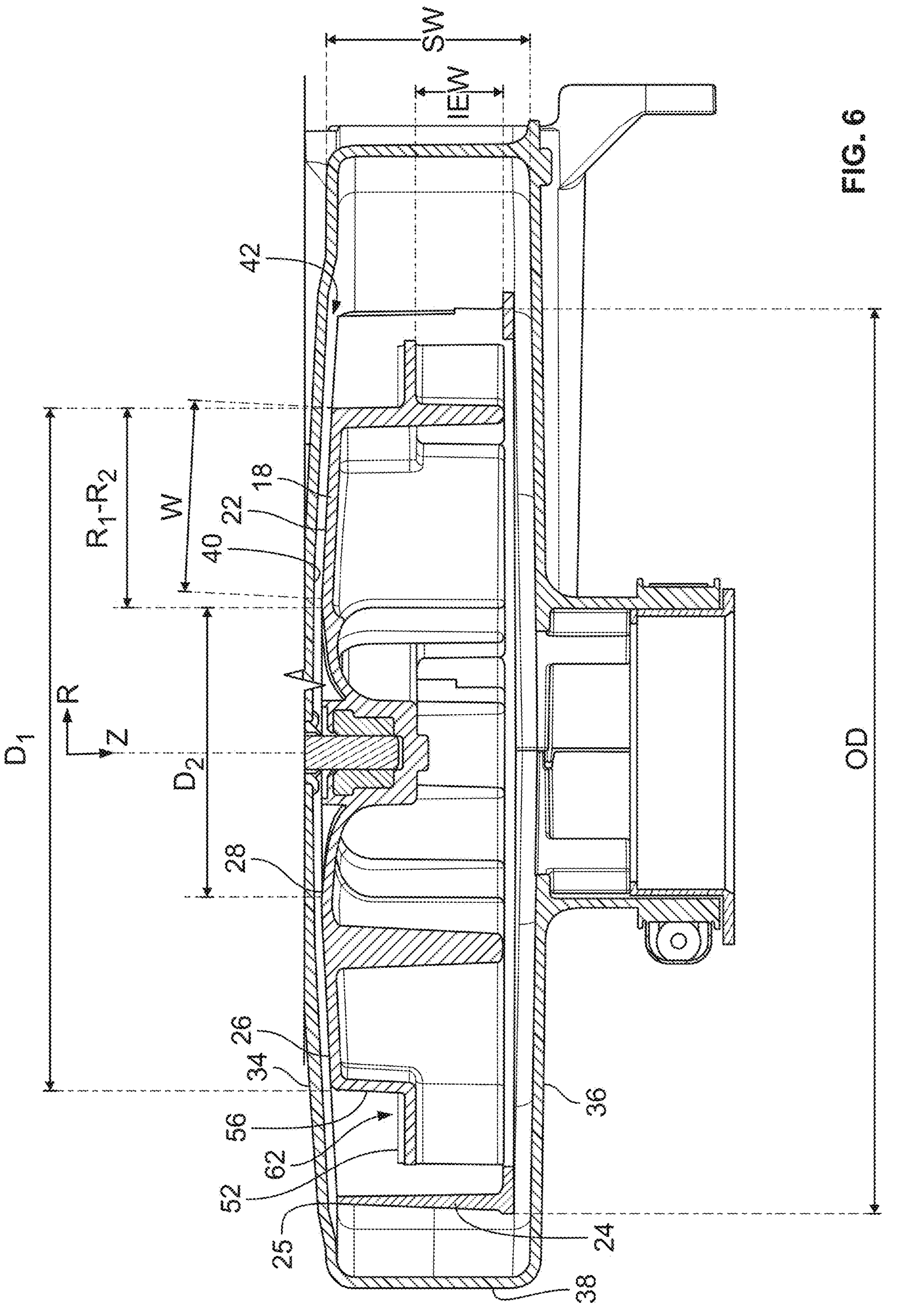
FIG. 6 is a partial cross-sectional side elevation view of the blower of FIG. 1.
Figure 7:
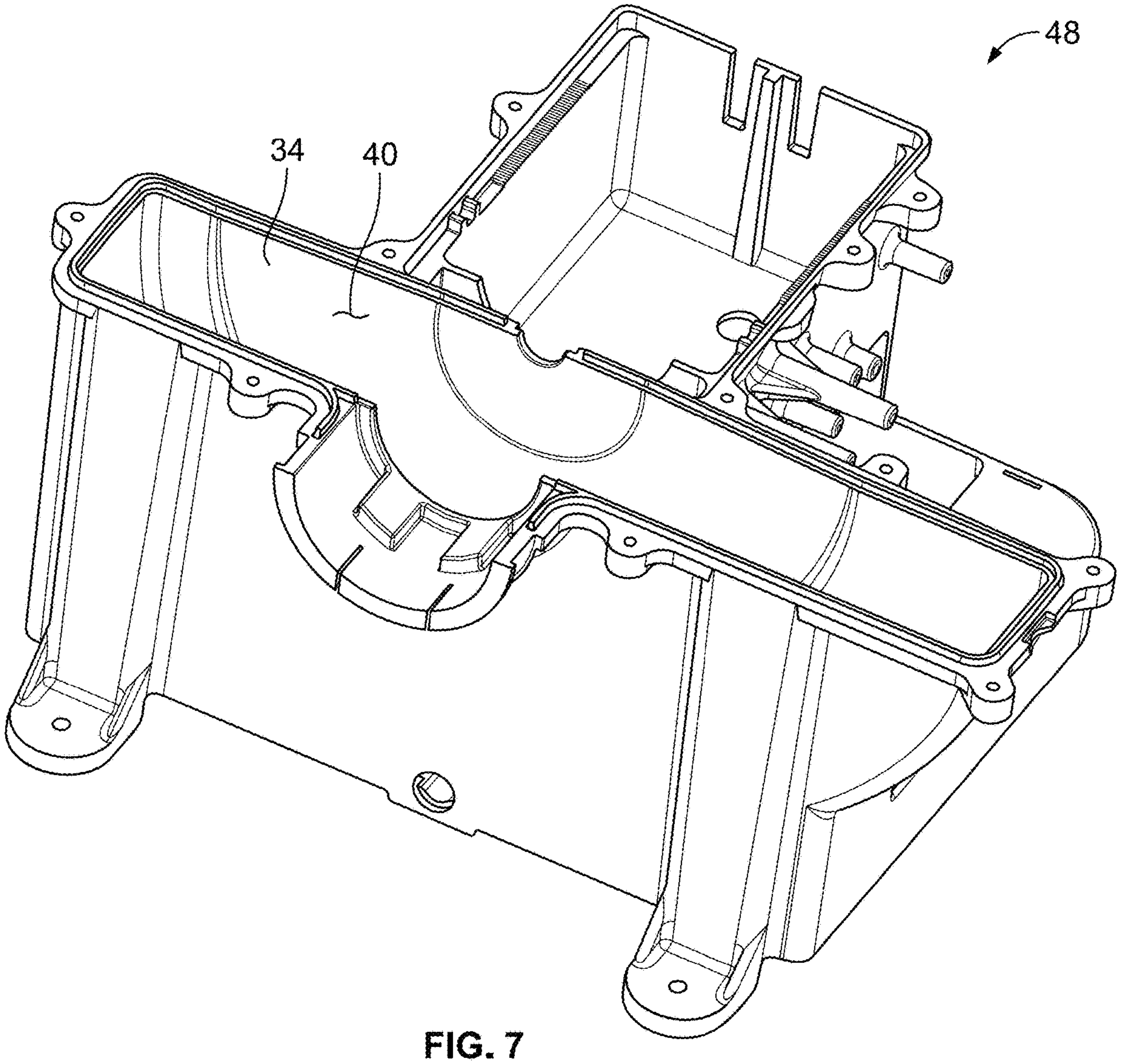
FIG. 7 is a top front perspective view of a housing member of the blower of FIG. 1.
Figure 8A:
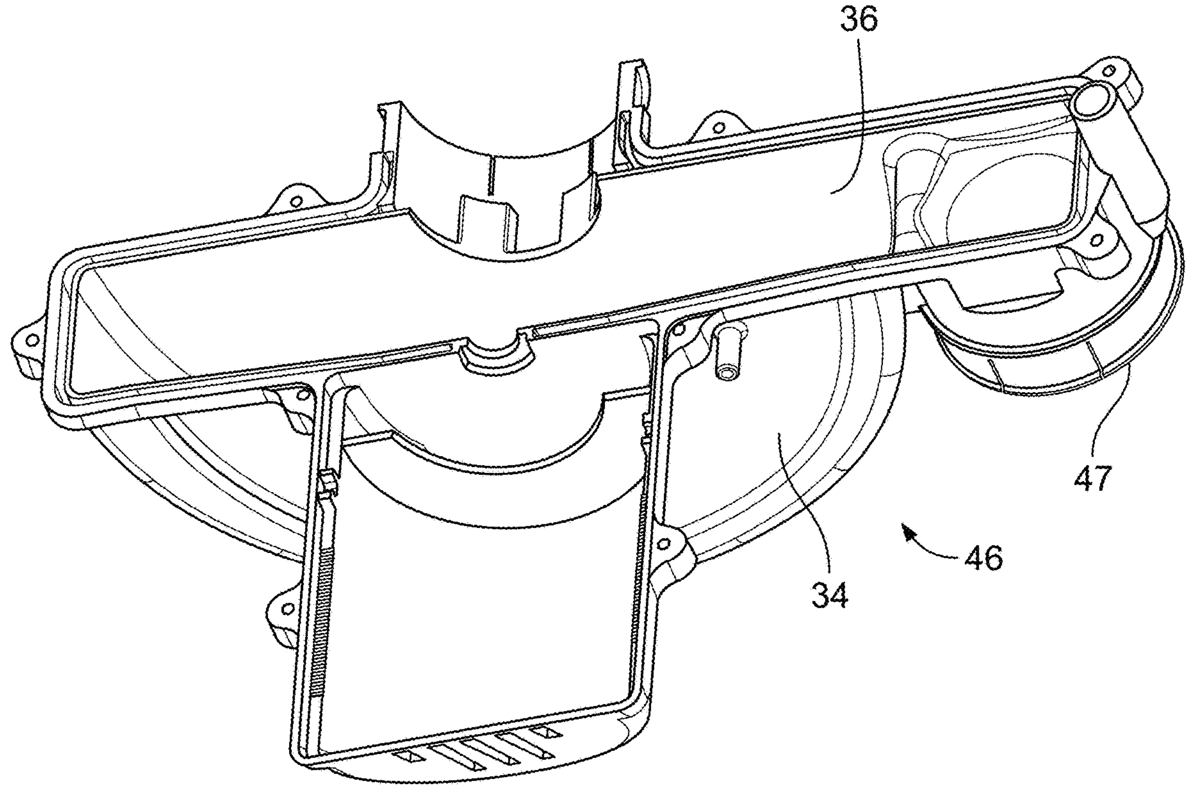
FIG. 8A is a bottom rear perspective view of another housing member of the blower of FIG. 1.
Figure 8B:
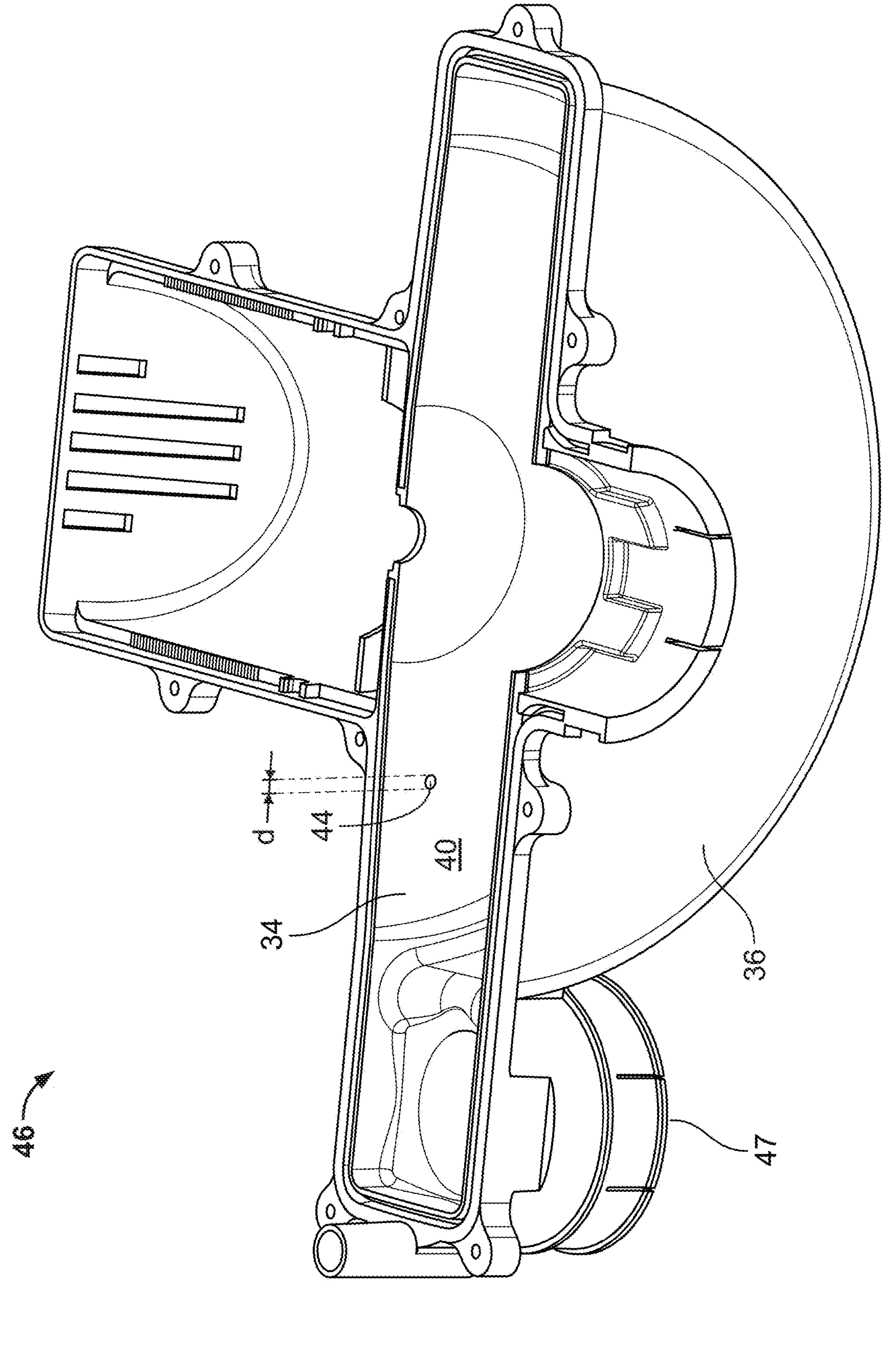
FIG. 8B is a bottom front perspective view of the housing member of FIG. 8A.
Figure 9:
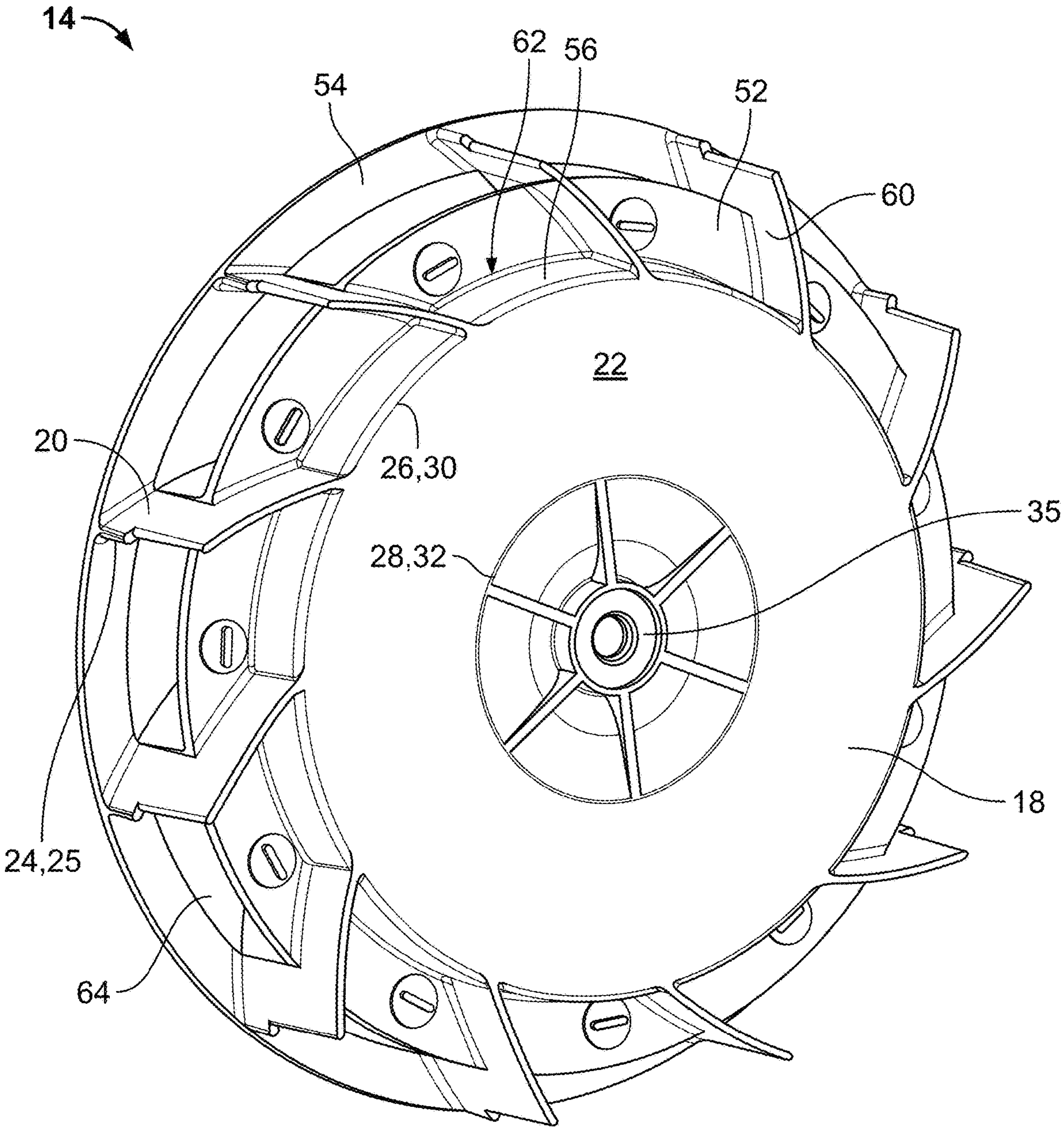
FIG. 9 is a rear perspective view of an impeller of the blower of FIG. 1.
Figure 10:
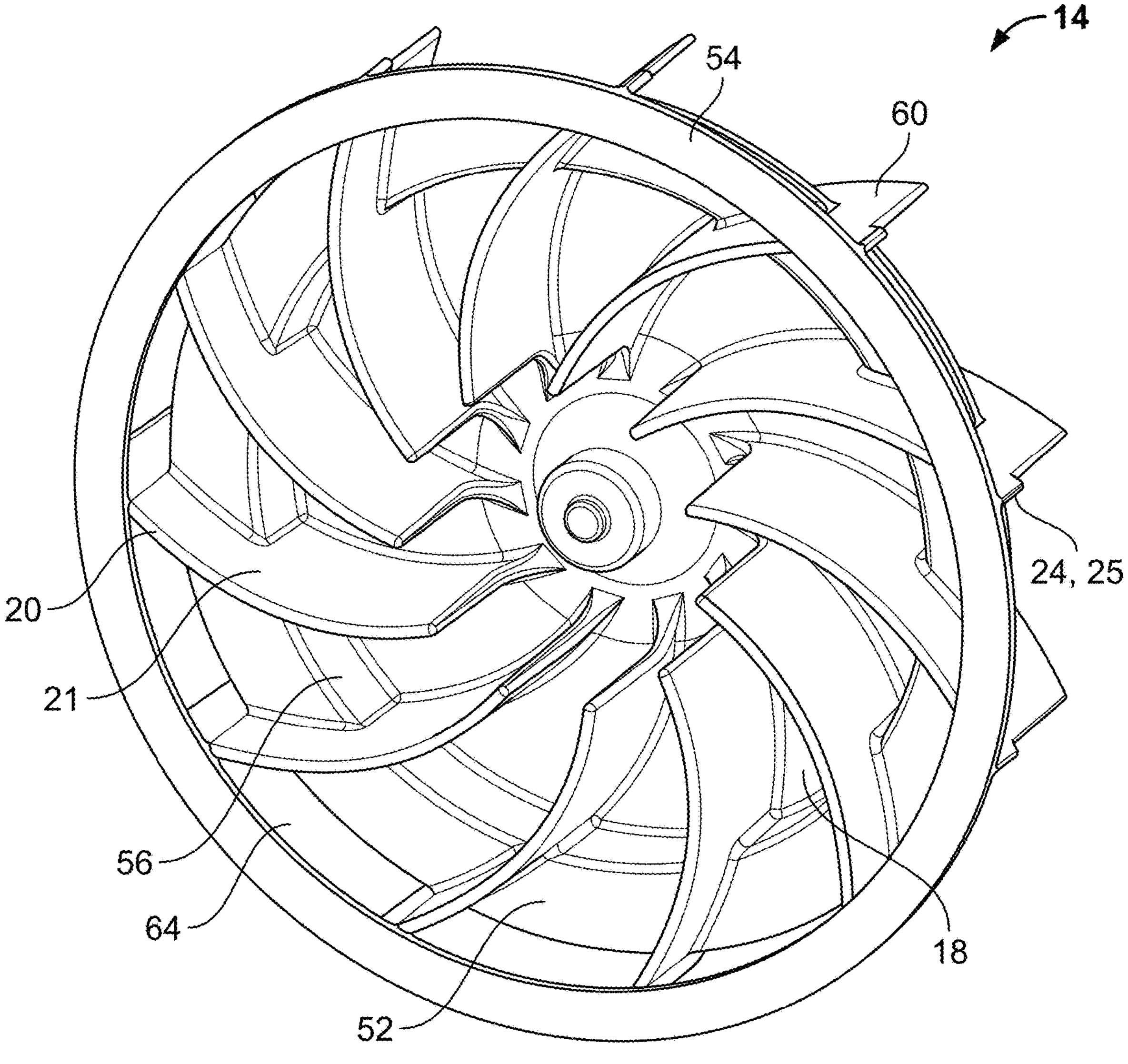
FIG. 10 is a front perspective view of the impeller of FIG. 9.
Figure 14:
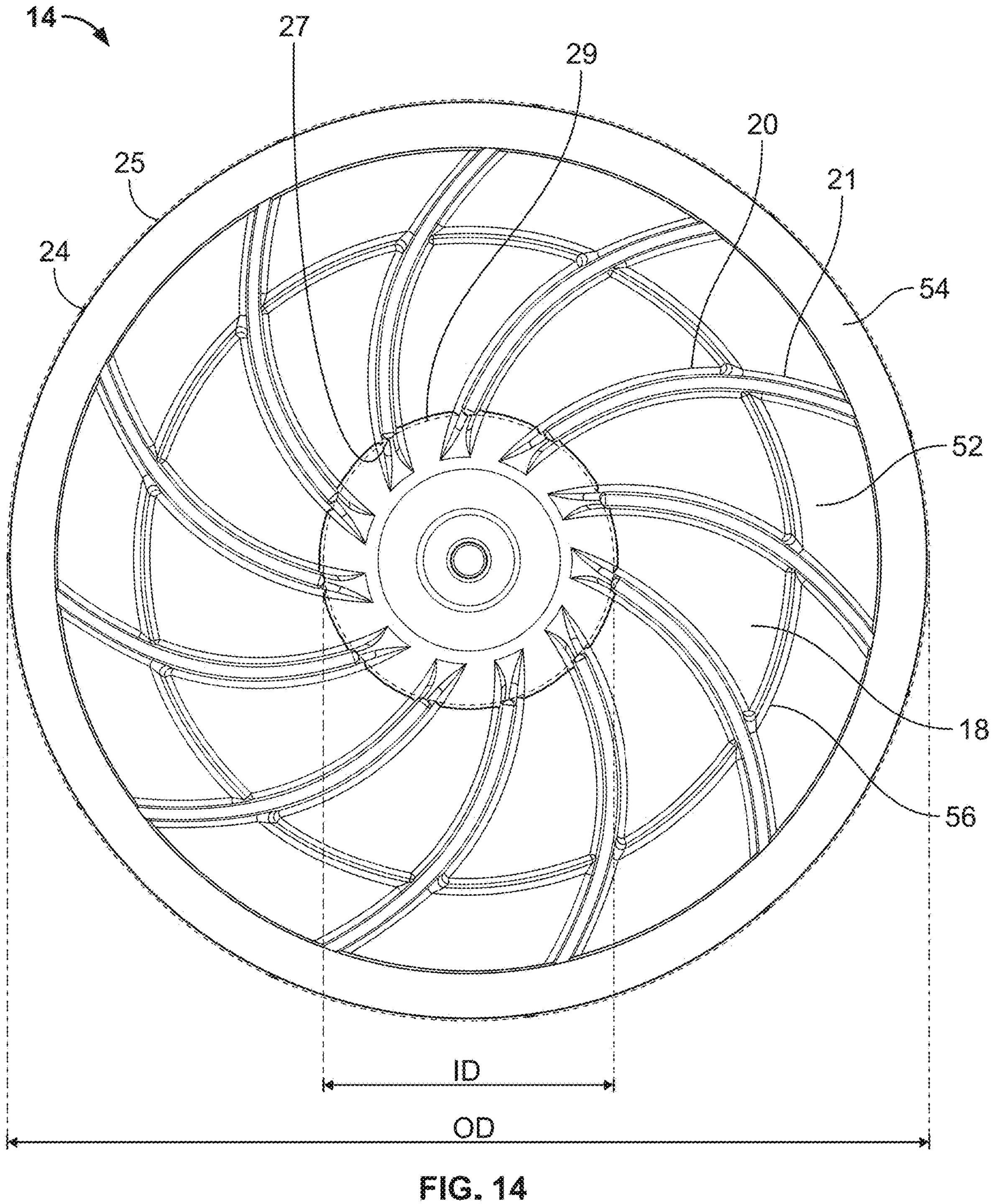
FIG. 14 is a front view of the impeller of FIG. 9.
Figure 15:
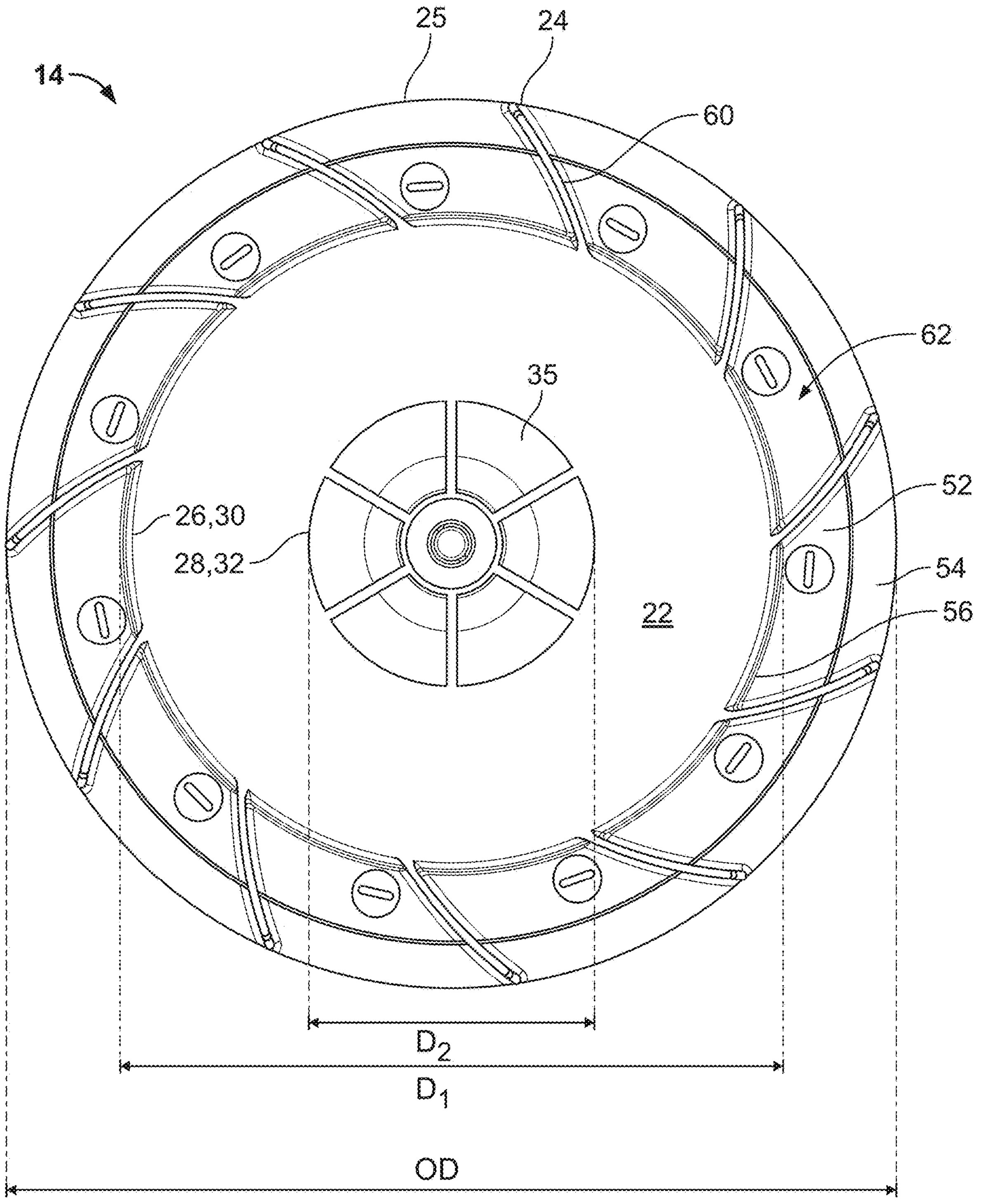
FIG. 15 is a rear view of the impeller of FIG. 9.
Figure 16:
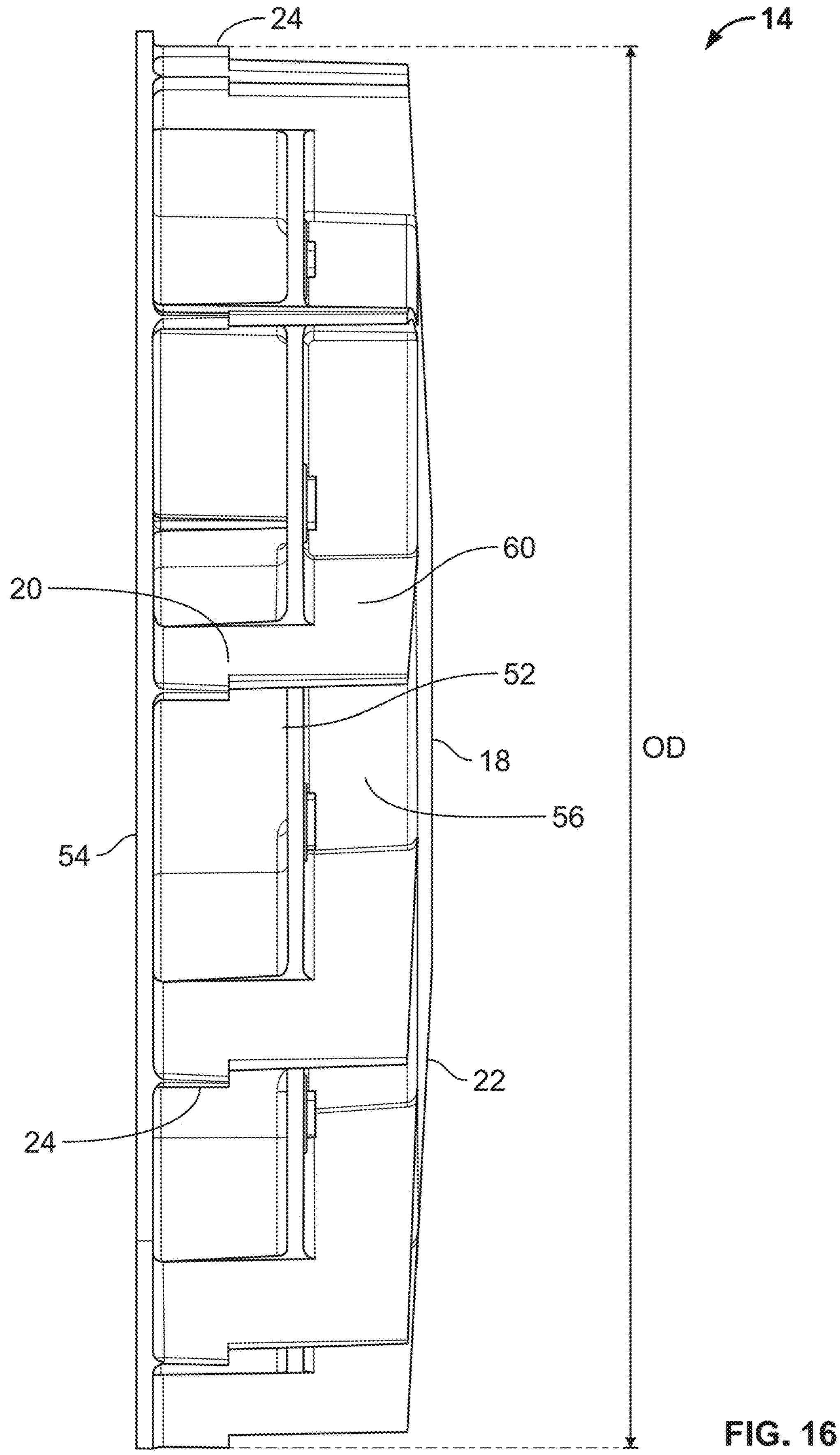
FIG. 16 is a side view of the impeller of FIG. 9.

The blower 10 may further comprise an inlet pressure static tap (not shown). The impeller 14 is rotatable about an impeller axis, the impeller axis defining perpendicular axial and radial directions Z, R, as indicated in FIGS. 1 and 6. The impeller 14 is illustrated separately from the blower 10 in various views in FIGS. 9-16. The impeller 14 has a backplate 18 and impeller blades 20 extending axially forward from the backplate 18 to respective impeller blade forward ends 21. The backplate 18 has a backplate outer diameter and a backplate back surface region 22, the backplate back surface region 22 facing axially rearward, the impeller blades 20 having radially outer ends 24 that combine to define an impeller outer circumference 25, the impeller outer circumference 25 having an impeller outer diameter OD, as indicated in FIGS. 6 and 14. The impeller blades 20 also have radially inner ends 27 that combine to define an impeller inner circumference 29 having an impeller inner diameter ID, as indicated in FIG. 14. The impeller 14 is illustrated as being a backward-curved impeller of a one-piece molded construction. Alternatively, an impeller may have forward-curved, backward-inclined, forward-inclined, or radial impeller blades, in conjunction with any of the other described and illustrated features of the impeller 14.

Molded clamshell blower housings are inexpensive to manufacture but are normally designed with some amount of standard draft, to facilitate removal of each of two molded housing members (each constituting a half of the clamshell) from a mold. Each molded housing member therefore normally comprises a portion that forms part of a back wall of a scroll compartment (scroll back wall) which is obliquely inclined with a respect to a plane in which the molded housing members meet in an assembled configuration. In an assembled blower with a molded clamshell housing, the impeller axis normally lies in the plane in which the two molded housing members meet, as does the axially widest portion of each molded housing member. This results in a varying axial gap between the scroll back wall and an impeller backplate. Consequently, it has been impractical to incorporate an exhaust pressure static tap in the scroll back wall of a clamshell molded blower housing, as a uniform axial gap between the scroll back wall and an impeller backplate is desired for the effective operation of the exhaust pressure static tap. In addition, the axial gap needs to be relatively small for a desired vacuum to be produced by a surface-to-surface velocity gradient between the impeller backplate and the scroll back wall. The impeller therefore needs to be positioned so that the backplate is relatively close to the scroll back wall. At the same time, when a one-piece impeller with an open front side is used, the impeller needs to be positioned with its front side close enough to the scroll front wall to limit efficiency loss due to reflow.

Even if the challenge of providing a uniform axial gap between an impeller backplate and a scroll back wall of a clamshell molded housing is addressed, an entirely separate challenge remains. That is, positioning an impeller close to the scroll front wall and close to the scroll back wall expands the footprint of the impeller so as to limit the remaining cross sectional area through which air that has been emitted from the impeller is forced to flow circumferentially around the periphery of the scroll compartment to the exhaust outlet of the scroll compartment. This can lead to excessive peripheral air velocities in the compartment for a given volumetric airflow rate, which in turn can produce noise and inefficiency. In applications that do not require an exhaust pressure static tap, the back wall of the scroll compartment can be spaced axially farther rearward of the impeller backplate to increase the available scroll volume for circumferential exhaust flow. Conversely, where an exhaust pressure static tap is required, the challenge of providing adequate scroll volume has been addressed by a scroll compartment that widens axially in a peripheral region that extends radially beyond an outer circumference of the impeller, while at least one of the scroll front and rear walls is recessed axially inwardly relative to the axially widened peripheral region. However, a scroll compartment having such a recessed wall portion is impractical to mold and therefore more expensive to manufacture. Finally, it should be noted that simply increasing the smallest scroll radius of the scroll compartment to provide more volume for circumferential exhaust flow would also be inadequate, as too much clearance between the impeller outer circumference and the cutoff of a scroll compartment would result in reflow losses near the cutoff.

The foregoing challenges are addressed by the blower 10 of the present disclosure, as will be evident in the following paragraphs.

In the illustrated embodiment, the challenge of providing a uniform axial gap between an impeller backplate and a scroll back wall is uniquely addressed by forming each molded housing member with radial draft in a respective portion that forms part of a scroll back wall in the assembled configuration, so as to form a substantially axisymmetric shape on a front surface of the scroll back wall. This substantially axisymmetric shape with radial draft allows the molded housing members to be removed from a mold, while a backplate back surface region of an impeller can be formed in substantially the same substantially axisymmetric shape, the two shapes aligning with the impeller axis in the assembled blower, so as to provide a uniform axial gap between the impeller backplate and the scroll back wall that remains uniform as the impeller is rotated about its axis. Alternatively, though not shown in the drawings, the scroll back wall may be formed without radial draft, such as by forming the two housing members in such a shape that their open sides meet in a plane oblique to the respective directions in which the housing members are to be removed from a respective mold, thus permitting their respective back wall portions to be coplanar with each other in a plane perpendicular to an impeller axis when the blower is assembled, while at the same time being inclined at a draft angle relative to their respective mold removal direction. In this manner, the scroll back wall would have a substantially planar front surface region and could be spaced by a uniform axial gap from a corresponding substantially planar backplate back surface region of an impeller.

Figure 11:
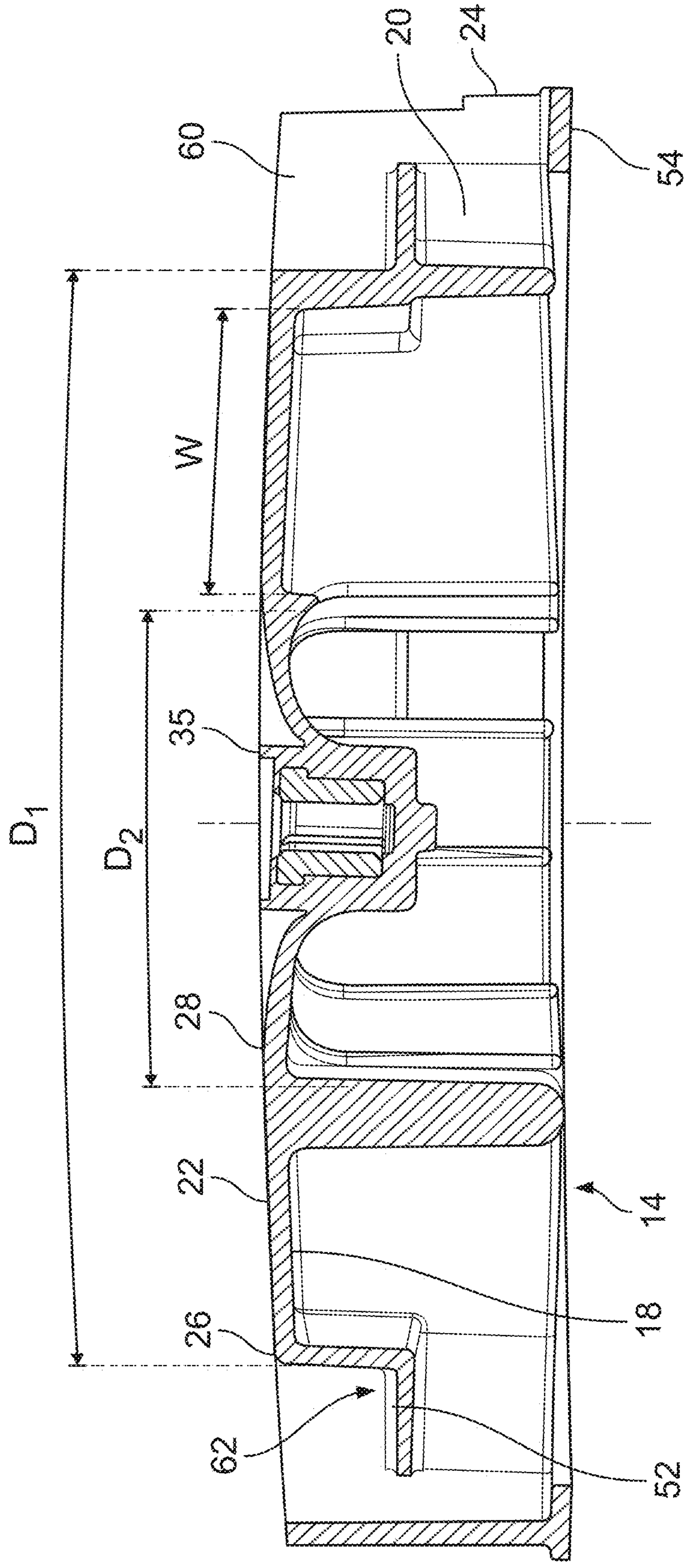
FIG. 11 is an elevation view of a cross section of the impeller of FIG. 9 cut along its axis.
Figure 12:
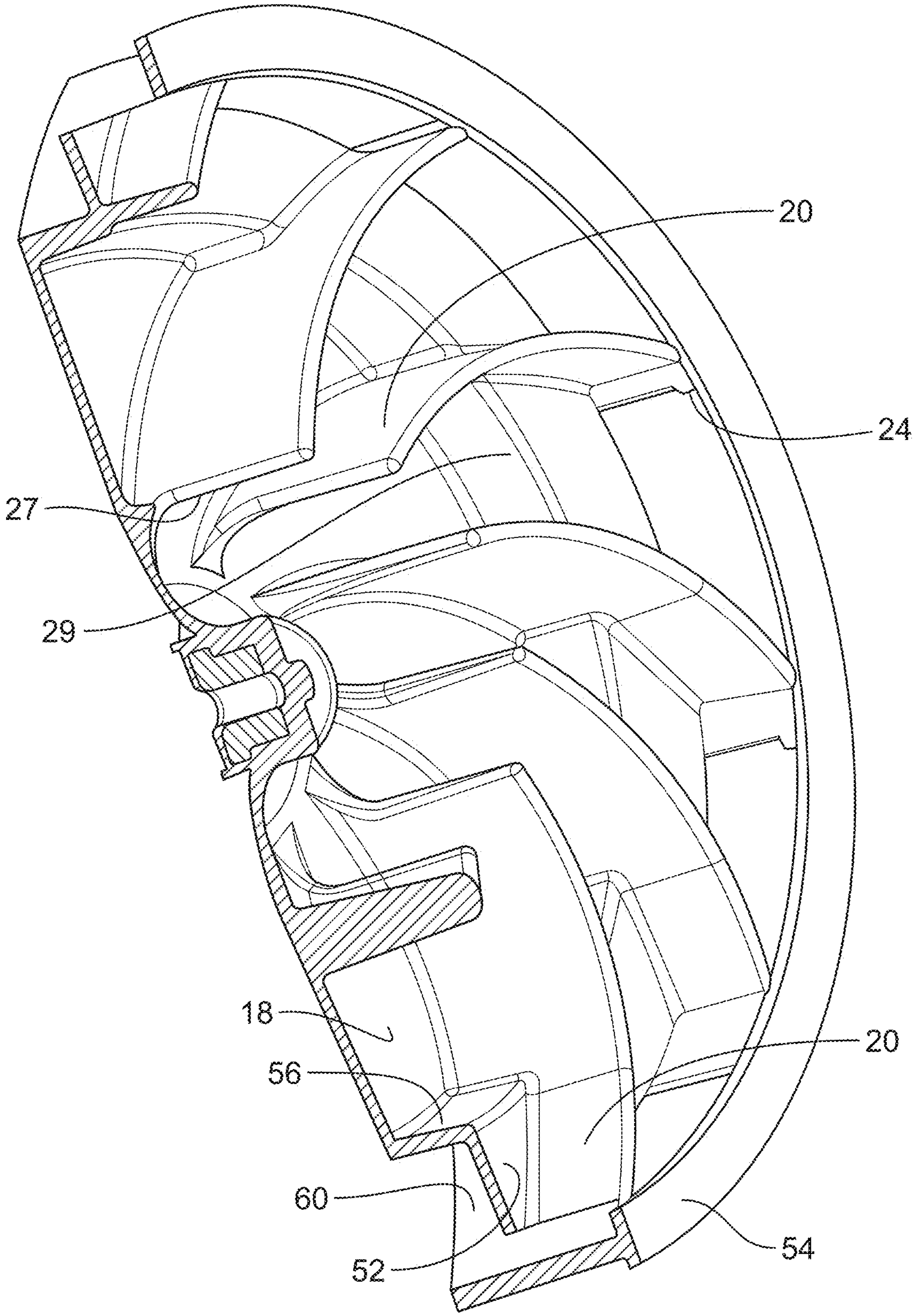
FIG. 12 is a cross-sectional front perspective view of the impeller of FIG. 9.
Figure 13:
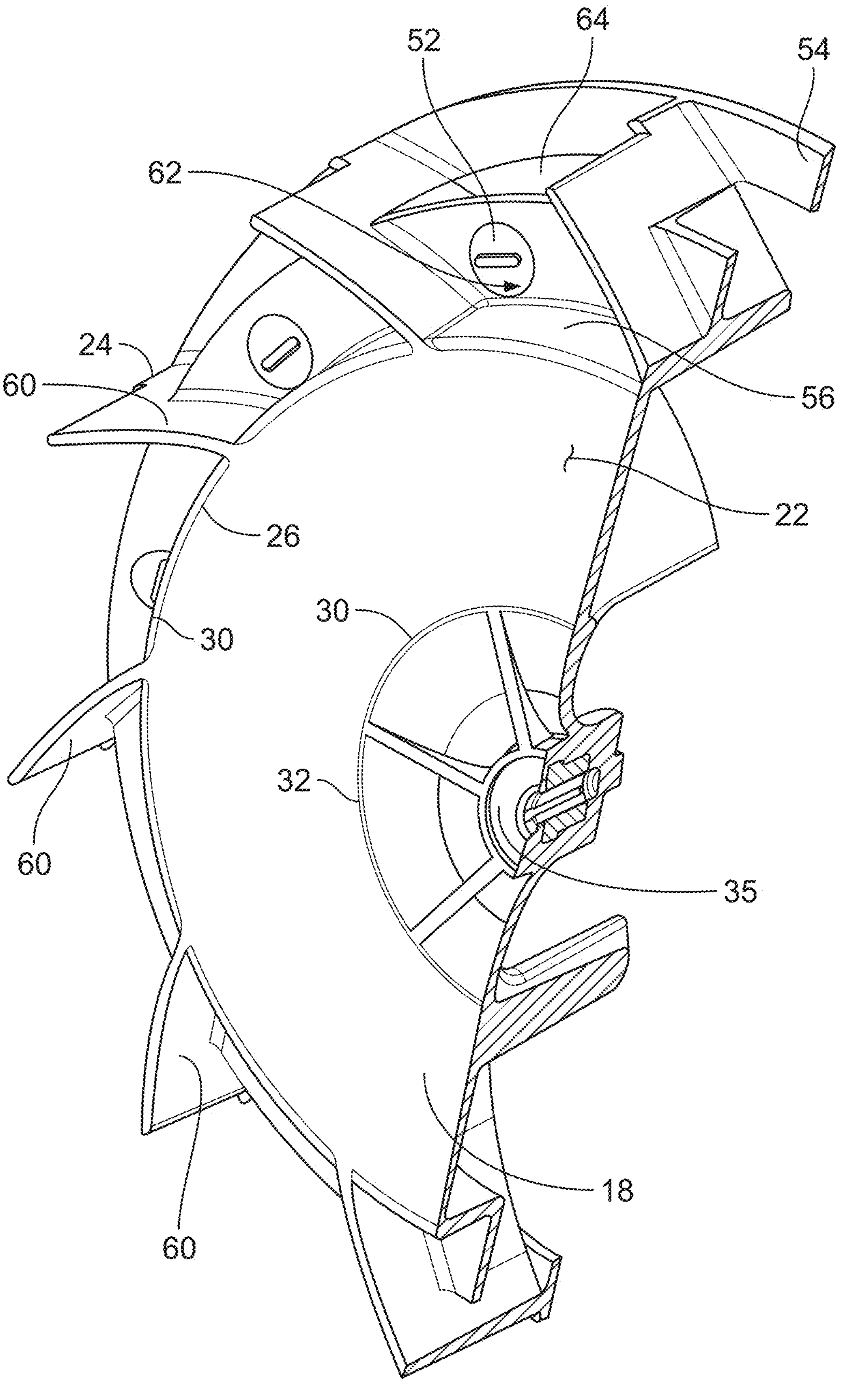
FIG. 13 is a cross-sectional rear perspective view of the impeller of FIG. 9.

As illustrated, the backplate back surface region 22 of the impeller backplate 18 has a first axial end 26 and a second axial end 28, the second axial end 28 being axially rearward of the first axial end 26, as most clearly seen in FIGS. 6 and 11-13. The first axial end 26 has a first circumference 30 and a first diameter $D_1$, and the second axial end 28 of the backplate back surface region has a second circumference 32 and a second diameter $D_2$, the first diameter $D_1$ being greater than the second diameter $D_2$, the second circumference 32 generally circumscribing the impeller axis, the first circumference 30 generally circumscribing the second circumference 32, and the first circumference 30 generally circumscribing the impeller axis. The backplate back surface region 22 generally circumscribes the impeller axis and converges radially inwardly as it extends axially rearwardly from the first axial end 26 toward the second axial end 28. More particularly, the backplate back surface region 22 continuously extends circumferentially around the impeller axis, continuously extends axially from the first axial end 26 to the second axial end 28, and continuously converges radially inwardly as it extends axially rearwardly from the first axial end 26 to the second axial end 28. This radial inward convergence allows the back surface region 22 to align with a scroll back wall surface that has been molded with radial draft, as shown in FIG. 6. The backplate back surface region 22 has a width W, as indicated in FIGS. 6 and 11, which is defined as a distance from the first circumference 30 to the second circumference 32 in a half plane extending from the impeller axis, as shown in the cross section depicted in FIG. 11.

A backplate back surface region should be understood as a region of a back surface of a backplate, and not necessarily an entire back surface of a backplate. For example, it will be noted that backplate back surface region 22 is not an entire back surface of backplate 18. Rather, backplate 18 additionally includes a hub region 35 that is generally circumscribed by backplate back surface 22 and comprises rearward facing surface areas, including areas that diverge radially in the axially rearward direction, as seen, for example, in FIGS. 6 and 11-14. Neither should the "axial ends" of an impeller backplate back surface region be understood to constitute or be defined by axial ends or extremes of any other part of the impeller. In the illustrated embodiment, the second axial end 28 of backplate back surface region 22 happens to be at or near an axially rearward end of the entire impeller 14 (see FIG. 11), but a second axial end of a backplate back surface region need not be so located. In addition, an impeller backplate back surface region described as converging radially inwardly in an axially rearward direction may comprise only a portion of a larger area of the backplate back surface that fits the description. In addition, the radial inward convergence of a backplate back surface region need not follow a straight line in a cross section along the impeller axis, as illustrated in FIG. 11, so as to form a conical surface region such as the illustrated backplate back surface region 22, but may instead follow a concave or convex curved path and/or may include stepped portions. Thus, a "back plate back surface region" may encompass any number of regions of a back surface of the same back plate, and should be understood to be further limited only where expressly stated, such as by the description above of certain intrinsic features of the backplate back surface region 22, and such as by the following description of how the backplate back surface region 22 relates to the clamshell blower housing 12.

Figure 2:
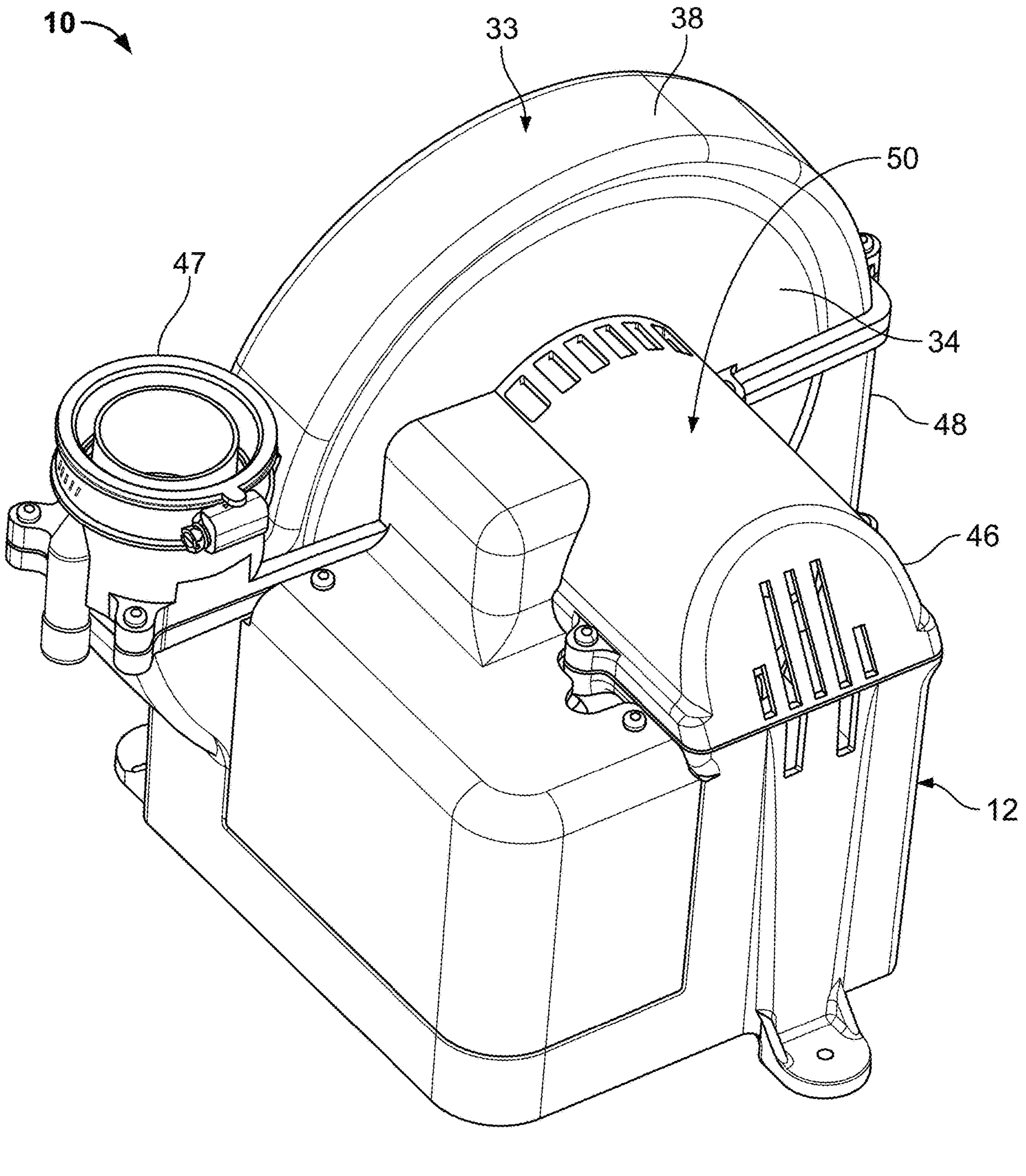
FIG. 2. Is a rear perspective view of the blower of FIG. 1.
Figure 3:
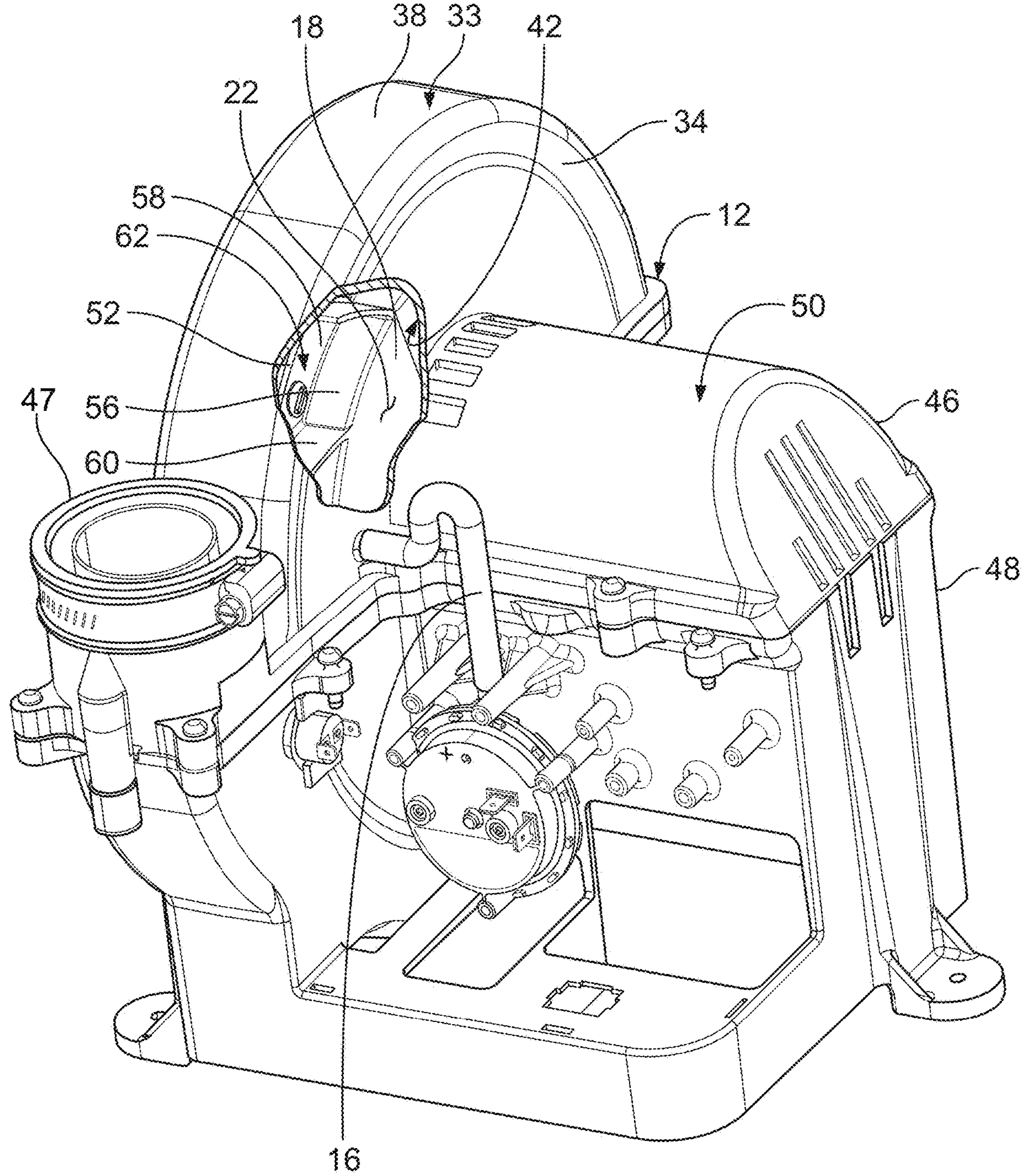
FIG. 3 is a rear perspective view of the blower of FIG. 1 with a cutaway section and a panel removed.
Figure 4:
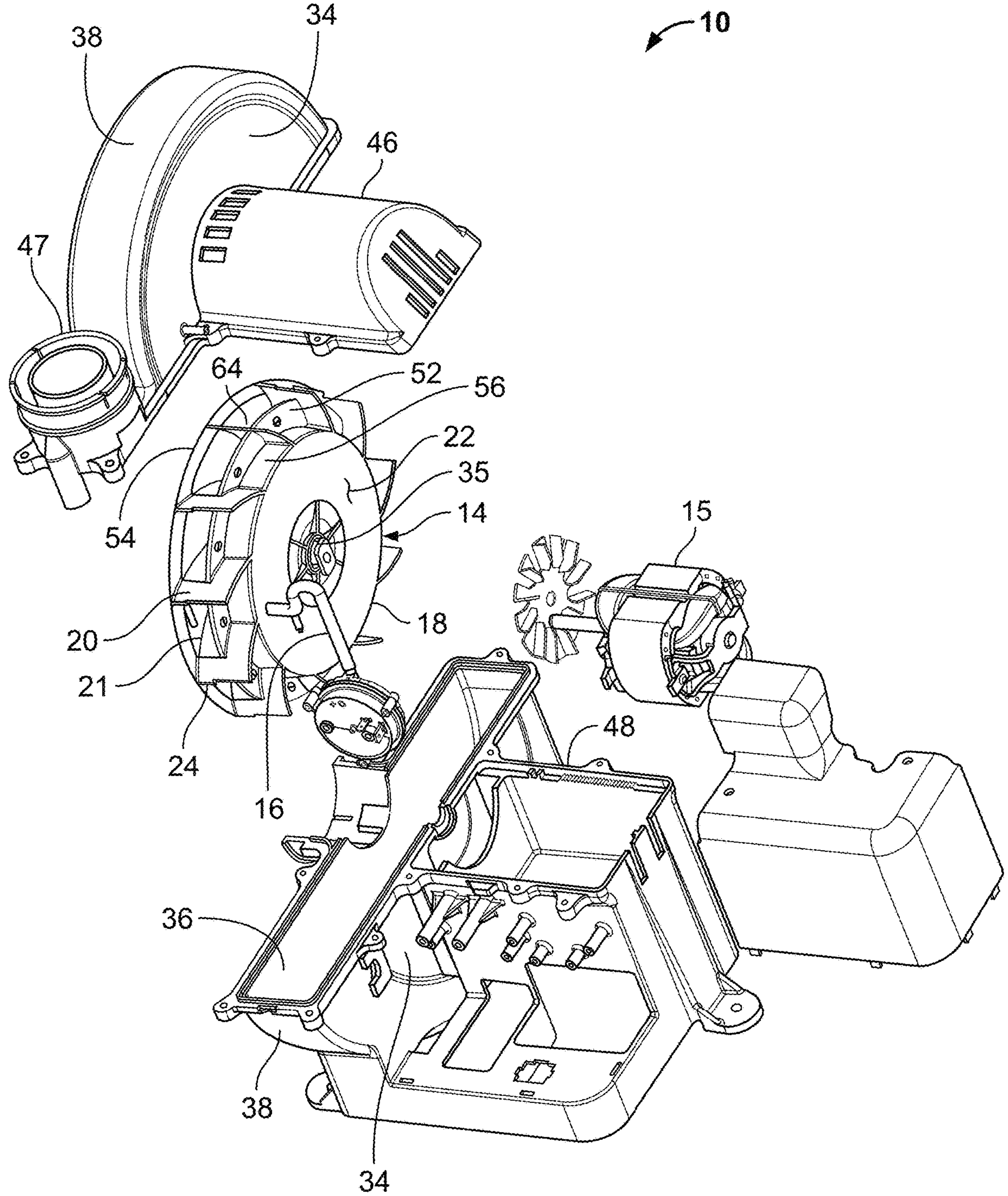
FIG. 4 is a rear exploded perspective view of the blower of FIG. 1.
Figure 5:
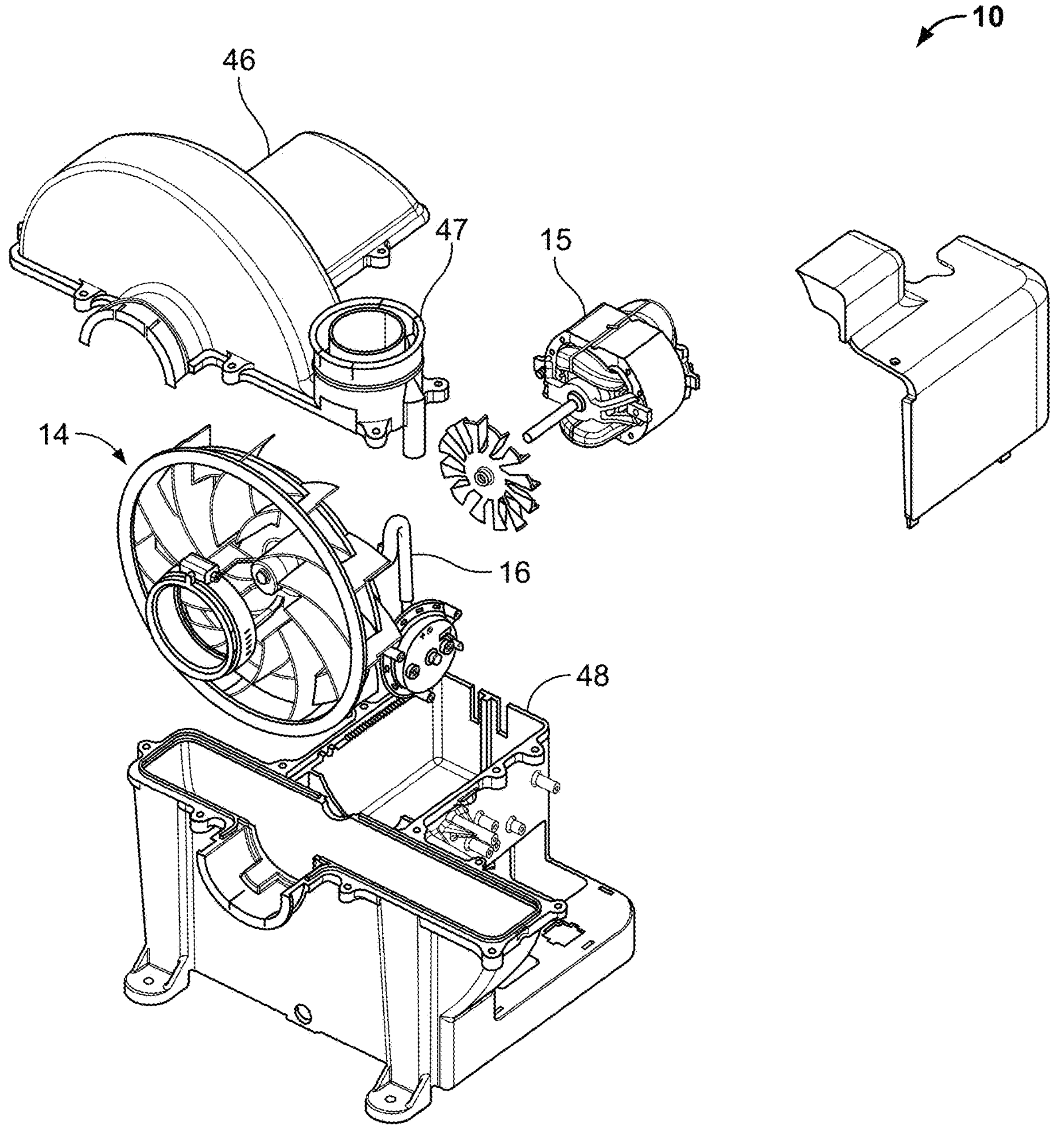
FIG. 5 is a front exploded perspective view of the blower of FIG. 1.

The clamshell blower housing 12 has a scroll compartment 33, as indicated in FIGS. 1-3. The scroll compartment 33 includes a scroll back wall 34 axially rearward of the impeller 14, a scroll front wall 36 axially forward of the impeller 14, and a peripheral scroll side wall 38 extending from a perimeter of the scroll front wall 36 to a perimeter of the scroll back wall 34, as shown in FIG. 6. The scroll back wall 34 has a scroll back wall front surface region 40 (see FIGS. 6 and 8B) facing the backplate back surface region 22 (FIG. 6). The backplate back surface region 22 is spaced axially forward from the scroll back wall front surface region 40 to form an axial gap 42 (FIGS. 3 and 6) extending from the backplate back surface region 22 to the scroll back wall front surface region 40. The scroll back wall 34 has an exhaust pressure static tap opening 44 adjacent the axial gap 42, the exhaust pressure static tap 16 being connected to the exhaust pressure static tap opening 44. Operation of the exhaust pressure static tap 16 may be affected by the size and uniformity of the axial dimension of the axial gap 42 and by the size of a transverse dimension (e.g., a radial dimension or a dimension parallel to the width W of the backplate back surface region 22) of the axial gap 42.

The axial gap 42 should be small enough to produce a desired vacuum pressure, but not so small as to be on the order of dimensional tolerances of the impeller backplate 18 or the scroll back wall 34, or to so isolate the exhaust pressure static tap opening 44 from the rest of the interior of the scroll compartment 33 that a sensor (not shown) sensitive to pressure at the exhaust pressure static tap opening 44 may fail to detect a significant pressure change occurring outside the bounds of the axial gap 42. The axial dimension of the axial gap 42 is preferably not greater than 0.22 inch and not less than 0.03 inch. More preferably, the axial dimension is not greater than 0.13 inch and not less than 0.05 inch. Still more preferably, the axial dimension is about 0.10 inch.

To provide an axial dimension of axial gap 42 that is substantially uniform, and that remains substantially uniform as the impeller 14 is rotated about its axis, the backplate back surface region 22 has substantially the same shape as the scroll back wall front surface region 40, and the shape of each is at least substantially axisymmetric with respect to the impeller axis. Preferably, the largest axial dimension of axial gap 42, measured from any point on the backplate back surface region 22 to the scroll back wall front surface region 40, when the impeller 14 is at any rotational position, is not more than twenty percent (and even more preferably not more than ten percent) greater than the smallest axial dimension of axial gap 42 measured from any other point on the backplate back surface region 22 and/or when the impeller 14 is at any other rotational position. Even more preferably, the largest such axial dimension of axial gap 42 is not more than five percent greater than the smallest such axial dimension of axial gap 42.

A transverse dimension of the axial gap 42 should be sufficient to accommodate the exhaust pressure static tap opening 44 well within the transverse bounds of the axial gap 42. Thus, the backplate back surface region width W is preferably at least twice a diameter d (seen in FIG. 8B) of the exhaust pressure static tap opening 44. More preferably, the backplate back surface region width W is at least four times the exhaust pressure static tap opening diameter d. The exhaust pressure static tap opening 44 is preferably spaced from the first circumference 30 toward the impeller axis along a direction parallel to the backplate back surface region width W by at least 0.4 times the exhaust pressure tap opening diameter and spaced from the second circumference 32 away from the impeller axis along an opposite direction parallel to the backplate back surface region width W by at least half the exhaust pressure tap opening diameter d. More preferably, the exhaust pressure static tap opening 44 is so spaced from each of the first circumference 30 and second circumference 32 by at least its diameter d.

In terms of relative dimensions of the impeller 14, the first diameter $D_1$ of the backplate back surface region 22 is preferably at least 50% of the impeller outer diameter OD, and the second diameter $D_2$ of the backplate back surface region 22 is at most 75% of the first diameter $D_1$. More preferably, the first diameter $D_2$ is at least 60% of the impeller outer diameter OD, and the second diameter $D_2$ is at most 60% of the first diameter $D_1$. A radial extent $R_1$-$R_2$ of the backplate back surface region 22, corresponding to a radial extent of the axial gap 42, is preferably at least about 5% of the impeller outer diameter OD, more preferably at least about 10% of the impeller outer diameter OD, and still more preferably at least about 15% of the impeller outer diameter OD.

The clamshell blower housing 12 is molded from a suitable plastic material (e.g., a mineral-filled and/or glass-filled polypropylene, polycarbonate, or alloy) and comprises a first molded housing member 46, which includes an exhaust outlet 47, and a second molded housing member 48 joined together in a clamshell configuration, shown in FIGS. 1-3. The second molded housing member 48 is shown separately in FIG. 7, and the first molded housing member 46 is shown separately in FIGS. 8A and 8B. Each of the first molded housing member 46 and the second molded housing member 48 comprises a portion of the scroll back wall 34, and each is molded with an amount of radial draft, such that scroll back wall front surface region 40 converges radially inwardly as it extends axially rearwardly (see, e.g., FIG. 6). In addition to the scroll compartment 33, the clamshell blower housing 12 may further comprise a motor compartment 50 (FIGS. 1-3) axially rearward of and partitioned from the scroll compartment 33 by the scroll back wall 34, the motor compartment 50 enclosing the motor 15.

Referring to FIGS. 6 and 9-16, in accordance with another aspect of the disclosure, the blower 10 addresses the challenge of positioning a blower impeller close to scroll front and rear walls of a molded clamshell blower housing, neither of which can be practically molded with an axially recessed central portion, while also leaving adequate scroll volume available in a scroll compartment of the housing for circumferential airflow in a periphery of the compartment. A unique shape of the impeller 14 helps to address this challenge.

The impeller 14 further comprises a back ring 52 and a front ring 54. The back ring 52 is connected to the front side of the backplate 18 and to the impeller blades 20. More particularly, the impeller comprises a skirt 56 extending circumferentially around the backplate 18 and extending axially forward from the backplate 18 to the back ring 52, the back ring 52 extending radially outward from the skirt 56. The back ring 52 and the skirt 56 combine to define a stepped area 62 comprising a radially outer side of the skirt 56 and a rear side of the back ring 52. It will be appreciated that the stepped area 62 addresses the challenge of providing adequate scroll volume for an airflow that has been discharged centrifugally past the outer ends 24 of the impeller blades 20, while maintaining the small axial gap 42 between the backplate back surface region 22 and the scroll back wall front surface region 40, and at the same time positioning the blade forward ends 21 close enough to the scroll front wall 36 to limit reflow losses.

The back ring 52 has a back ring outer circumference 58, a back ring outer diameter, and a back ring inner diameter. The back ring outer diameter is greater than the backplate outer diameter. The front ring 54 is connected to the forward ends 21 of the impeller blades 20, the front ring 54 having a front ring outer diameter and a front ring inner diameter, the front ring outer diameter being greater than the back ring outer diameter, and the front ring inner diameter being approximately equal to the back ring outer diameter, as best seen in FIGS. 6, 11, 14, and 15. The impeller blades 20 extend axially forward from the back ring 52 to the front ring 54, and the impeller 14 further comprises impeller back fins 60 (FIGS. 12, 13, 15, 16), the impeller back fins 60 extending axially rearward from the back ring 52 and being spaced from one another circumferentially about the impeller axis. The impeller back fins 60 are optional but have been observed to enhance the performance of the exhaust pressure static tap 16. The impeller back fins 60 are shown to be aligned and contiguous with the impeller blades 20, but they may instead have a different form and/or arrangement about the impeller axis. The impeller 14 has an impeller exhaust width IEW (FIG. 6), the impeller exhaust width IEW being defined as an axial distance between the back ring outer circumference 58 and the impeller blade forward ends 21. The back ring 52, the impeller blades 20, and the front ring 54 combine to define a plurality of impeller exhaust openings 64 (FIGS. 9, 10), each impeller exhaust opening 64 extending circumferentially from one of the impeller blades 20 to an adjacent one of the impeller blades 20 and axially from the back ring 52 to the front ring 54.

The blower 10 has a scroll width SW (FIG. 6), the scroll width SW being an axial distance from the scroll front wall 36 to the scroll back wall 34 at the impeller outer circumference 25. In the illustrated embodiment, the axial distance from the scroll front wall 36 to the scroll back wall 34 at the impeller outer circumference 25 is uniform (see, e.g., FIGS. 7, 8A, and 8B). Alternatively, this axial distance may not be uniform, but may vary about the impeller outer circumference, in which case the scroll width is defined as the largest axial distance from the scroll front wall to the scroll back wall at the impeller outer circumference. Preferably, a ratio of the scroll width SW to the impeller exhaust width IEW is not less than 1.5 and not greater than 4.0. More preferably, the ratio is approximately 2.0.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A blower comprising:

a blower housing;

an impeller within the blower housing, the impeller being rotatable about an impeller axis, the impeller axis defining perpendicular axial and radial directions, the impeller having a backplate and impeller blades extending axially forward from the backplate, the backplate including a backplate back surface region, the backplate back surface region facing axially rearward, the impeller blades having radially outer ends that combine to define an impeller outer circumference, the impeller outer circumference having an impeller outer diameter;

an exhaust pressure static tap;

the backplate back surface region having a first axial end and a second axial end, the second axial end being axially rearward of the first axial end, the first axial end of the backplate back surface region having a first circumference and a first diameter, and the second axial end of the backplate back surface region having a second circumference and a second diameter, the first diameter being greater than the second diameter, the backplate back surface region converging radially inwardly as the backplate back surface region extends axially rearwardly from the first axial end toward the second axial end;

the blower housing having a scroll back wall axially rearward of the impeller and a scroll front wall axially forward of the impeller, the scroll back wall having a scroll back wall front surface region facing the backplate back surface region, the backplate back surface region having a shape, the scroll back wall front surface region having substantially the same shape as the backplate back surface region, the backplate back surface region being spaced axially forward from the scroll back wall front surface region to form a generally uniform axial gap extending from the backplate back surface region to the scroll back wall front surface region;

the scroll back wall having an exhaust pressure static tap opening adjacent the axial gap, the exhaust pressure static tap being connected to the exhaust pressure static tap opening.

2. A blower in accordance with claim 1 wherein the shape of the backplate back surface region is substantially axisymmetric with respect to the impeller axis.

3. A blower in accordance with claim 1 wherein the blower housing comprises a first molded housing member and a second molded housing member, the first molded housing member and the second molded housing member being joined together in a clamshell configuration, the first molded housing member comprises a first portion of the scroll back wall, and the second molded housing member comprises a second portion of the scroll back wall.

4. A blower in accordance with claim 1 wherein the backplate back surface region has a width defined as a distance from the first circumference to the second circumference in a half plane extending from the impeller axis, and the width of the backplate back surface region is generally uniform about the first circumference and the second circumference.

5. A blower in accordance with claim 1 wherein the backplate back surface region continuously extends circumferentially around the impeller axis, the backplate back surface region continuously extends axially from the first axial end to the second axial end, and the back plate back surface region continuously converges radially inwardly as the backplate back surface region extends axially rearwardly from the first axial end to the second axial end.

6. A blower in accordance with claim 1 wherein each impeller blade has a radially inner end, the radially inner ends of the impeller blades combining to define an impeller inner circumference having an impeller inner diameter.

7. A blower in accordance with claim 1 wherein the impeller is of a one-piece molded construction.

8. A blower in accordance with claim 1 wherein the impeller is a backward-curved impeller.

9. A blower in accordance with claim 1, further comprising a motor within the blower housing.

10. A blower in accordance with claim 1 wherein the axial gap is not less than 0.03 inch and not greater than 0.22 inch.

11. A blower in accordance with claim 1 wherein the axial gap is not less than 0.05 inch and not greater than 0.13 inch.

12. A blower in accordance with claim 1, further comprising a motor, wherein the housing comprises a motor compartment and a scroll compartment, the motor compartment being partitioned from the scroll compartment by the scroll back wall, the impeller being located within the scroll compartment, the motor being located within the motor compartment.

13. A blower in accordance with claim 1 wherein the axial gap is approximately 0.10 inch.

14. A blower in accordance with claim 1, further comprising an inlet pressure static tap.

15. A blower in accordance with claim 1 wherein the exhaust pressure static tap opening has a diameter, the width of the backplate back surface region being at least twice the exhaust pressure static tap opening diameter.

16. A blower in accordance with claim 15 wherein the width of the backplate back surface region is at least four times the exhaust pressure static tap opening diameter.

17. A blower in accordance with claim 15 wherein the exhaust pressure static tap opening is spaced from the first circumference toward the impeller axis along a first direction parallel to the backplate back surface region width by at least half the exhaust pressure tap opening diameter and spaced from the second circumference away from the impeller axis along a second direction parallel to the backplate back surface region width by at least half the exhaust pressure tap opening diameter.

18. A blower comprising:

a blower housing;

an impeller within the blower housing, the impeller being rotatable about an impeller axis, the impeller axis defining perpendicular axial and radial directions, the impeller having a backplate and impeller blades, the impeller blades being spaced from one another circumferentially about the impeller axis, the impeller blades extending axially forward from the backplate to a blade forward end of the respective impeller blade, the backplate including an axially rearward facing backplate back surface region, the impeller blades having radially outer ends that combine to define an impeller outer circumference, the impeller outer circumference having an impeller outer diameter;

the backplate back surface region having a first axial end and a second axial end, the second axial end being axially rearward of the first axial end, and the backplate back surface region converging radially inwardly as the backplate back surface region extends axially rearwardly from the first axial end toward the second axial end, the first axial end of the backplate back surface region having a first diameter and the second axial end of the backplate back surface region having a second diameter, the second diameter being not more than 75% of the first diameter and the first diameter being not less than 50% of the impeller outer diameter;

the blower housing having a scroll back wall axially rearward of the impeller and a scroll front wall axially forward of the impeller, the backplate back surface region being spaced axially forward from the scroll back wall by a generally uniform axial gap distance to form a generally uniform axial gap extending axially rearward from the backplate back surface region to the scroll back wall.

19. A blower in accordance with claim 18, further comprising an exhaust pressure static tap, the scroll back wall having an exhaust pressure static tap opening adjacent the axial gap, the exhaust pressure static tap being connected to the exhaust pressure static tap opening.

20. A blower in accordance with claim 18 wherein the impeller further comprises a skirt extending circumferentially around the backplate and extending axially forward from the backplate to a back ring, the back ring extending radially outward from the skirt.

21. A blower in accordance with claim 18 further comprising:

a back ring connected to the front side of the backplate and to the impeller blades, the back ring having a back ring outer diameter and a back ring inner diameter, the backplate having a backplate outer diameter, the back ring outer diameter being greater than the backplate outer diameter; and a front ring connected to the forward ends of the impeller blades, the front ring having a front ring outer diameter and a front ring inner diameter, the front ring outer diameter being greater than the back ring outer diameter;

wherein the impeller blades extend axially forward from the back ring to the front ring, the impeller further comprising impeller back fins, the impeller back fins being spaced from one another circumferentially about the impeller axis, the impeller back fins extending axially rearward from the back ring.

22. A blower comprising:

a blower housing;

an impeller within the blower housing, the impeller being rotatable about an impeller axis, the impeller axis defining perpendicular axial and radial directions;

the impeller comprising a backplate, impeller blades, and a ring;

the backplate of the impeller having a backplate front surface and a backplate back surface;

the ring having a ring front surface and an outer circumference, the ring being spaced axially forward of the backplate;

the impeller blades having radially outer ends that combine to define an impeller outer circumference, the impeller outer circumference having an impeller outer diameter, each of the impeller blades extending axially forward from the ring to an impeller blade forward end of the respective impeller blade;

the impeller having an impeller exhaust width, the impeller exhaust width being defined as an axial distance between the ring outer circumference and the impeller blade forward ends;

the blower housing comprising a scroll back wall spaced axially rearward of the impeller, and a scroll front wall axially forward of the impeller;

the blower having a scroll width, the scroll width being a greatest axial distance from the scroll front wall to the scroll back wall at the impeller outer circumference;

a ratio of the scroll width to the impeller exhaust width being not less than 1.5 and not greater than 4.0.

23. A blower in accordance with claim 22 wherein the axial distance from the scroll front wall to the scroll back wall at the impeller outer circumference is uniform.

24. A blower in accordance with claim 22 wherein the impeller blades are connected to the backplate.

25. A blower in accordance with claim 22 wherein the ring constitutes a back ring having a back ring outer diameter, the impeller further comprising a front ring connected to the impeller blade forward ends, the front ring having a front ring outer diameter and a front ring inner diameter, the front ring outer diameter being greater than the back ring outer diameter.

26. A blower in accordance with claim 25 wherein the back ring, the impeller blades, and the front ring combine to define a plurality of impeller exhaust openings, each impeller exhaust opening extending circumferentially from one of the impeller blades to an adjacent one of the impeller blades and axially from the back ring to the front ring.

27. A blower in accordance with claim 25 wherein the front ring inner diameter is approximately equal to the back ring outer diameter.

28. A blower in accordance with claim 22 wherein the ratio of the impeller exhaust width to the scroll width is approximately 2.0.

29. A blower comprising:

a blower housing;

an impeller within the blower housing, the impeller being rotatable about an impeller axis, the impeller axis defining perpendicular axial and radial directions, the impeller having a backplate and impeller blades extending axially forward from the backplate, the backplate including a backplate back surface region, the impeller blades having radially outer ends that combine to define an impeller outer circumference, the impeller outer circumference having an impeller outer diameter;

an exhaust pressure static tap;

the backplate back surface region having a first axial end and a second axial end, the backplate back surface region converging radially inwardly as the backplate back surface region extends axially rearwardly from the first axial end toward the second axial end;

the blower housing having a scroll back wall axially rearward of the impeller and a scroll front wall axially forward of the impeller, the scroll back wall having a scroll back wall front surface region, the backplate back surface region having a shape, the scroll back wall front surface region having substantially the same shape as the backplate back surface region, the backplate back surface region being spaced axially forward from the scroll back wall front surface region to form a generally uniform axial gap extending from the backplate back surface region to the scroll back wall front surface region;

the scroll back wall having an exhaust pressure static tap opening adjacent the axial gap, the exhaust pressure static tap being connected to the exhaust pressure static tap opening.

* * * * *